US007034712B2

(12) United States Patent
Rogers

(10) Patent No.: US 7,034,712 B2
(45) Date of Patent: **\*Apr. 25, 2006**

(54) INTEGRATED REMOTE CONTROL UNIT FOR OPERATING A TELEVISION AND A VIDEO GAME UNIT

(75) Inventor: James M. Rogers, Alpharetta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/878,842

(22) Filed: Jun. 28, 2004

(65) Prior Publication Data

US 2004/0263696 A1    Dec. 30, 2004

Related U.S. Application Data

(63) Continuation of application No. 09/750,137, filed on Dec. 29, 2000, now Pat. No. 6,794,992.

(51) Int. Cl.
*H04B 1/40* (2006.01)

(52) U.S. Cl. .......................... 340/825.25; 340/825.22; 340/825.69; 340/825.72; 340/5.61; 340/5.64; 341/173; 341/176

(58) Field of Classification Search ........... 340/825.25, 340/825.22, 825.69, 5.61, 5.64, 825.72; 348/14.05, 348/734; 367/133; 341/173, 174, 176
See application file for complete search history.

(56) References Cited

U.S. PATENT DOCUMENTS

| 4,959,810 | A | | 9/1990 | Darbee |
| 5,235,328 | A | * | 8/1993 | Kurita ................... 340/825.72 |
| 5,414,426 | A | | 5/1995 | O'Donnell |
| 5,579,002 | A | * | 11/1996 | Iggulden et al. .............. 341/23 |
| 6,445,933 | B1 | * | 9/2002 | Pettit ....................... 455/556.1 |
| 6,507,306 | B1 | * | 1/2003 | Griesau et al. ............. 341/176 |
| 6,794,992 | B1 | * | 9/2004 | Rogers .................. 340/825.25 |

\* cited by examiner

*Primary Examiner*—Brian Zimmerman
*Assistant Examiner*—Vernal Brown
(74) *Attorney, Agent, or Firm*—Walters & Zimmerman; Geoff Sutcliffe; Todd Mitchem

(57) ABSTRACT

A hand-held remote control unit for controlling the operation of a television and other electronic audio/video components, such as a VCR, DVD player, or home stereo, operates in a different mode for use as a video game controller. The location and position of the push buttons on the remote controller unit are arranged such that a subset of the buttons that are used for the television remote control are operable in a different mode as a video game controller. A user rotates the remote control unit from a vertically upright position to a horizontal position to use the remote control unit for operating a video gaming system. When used as a video game controller, the controller indicates which of the subset of buttons on the remote control are to be used for operating the video game.

20 Claims, 13 Drawing Sheets

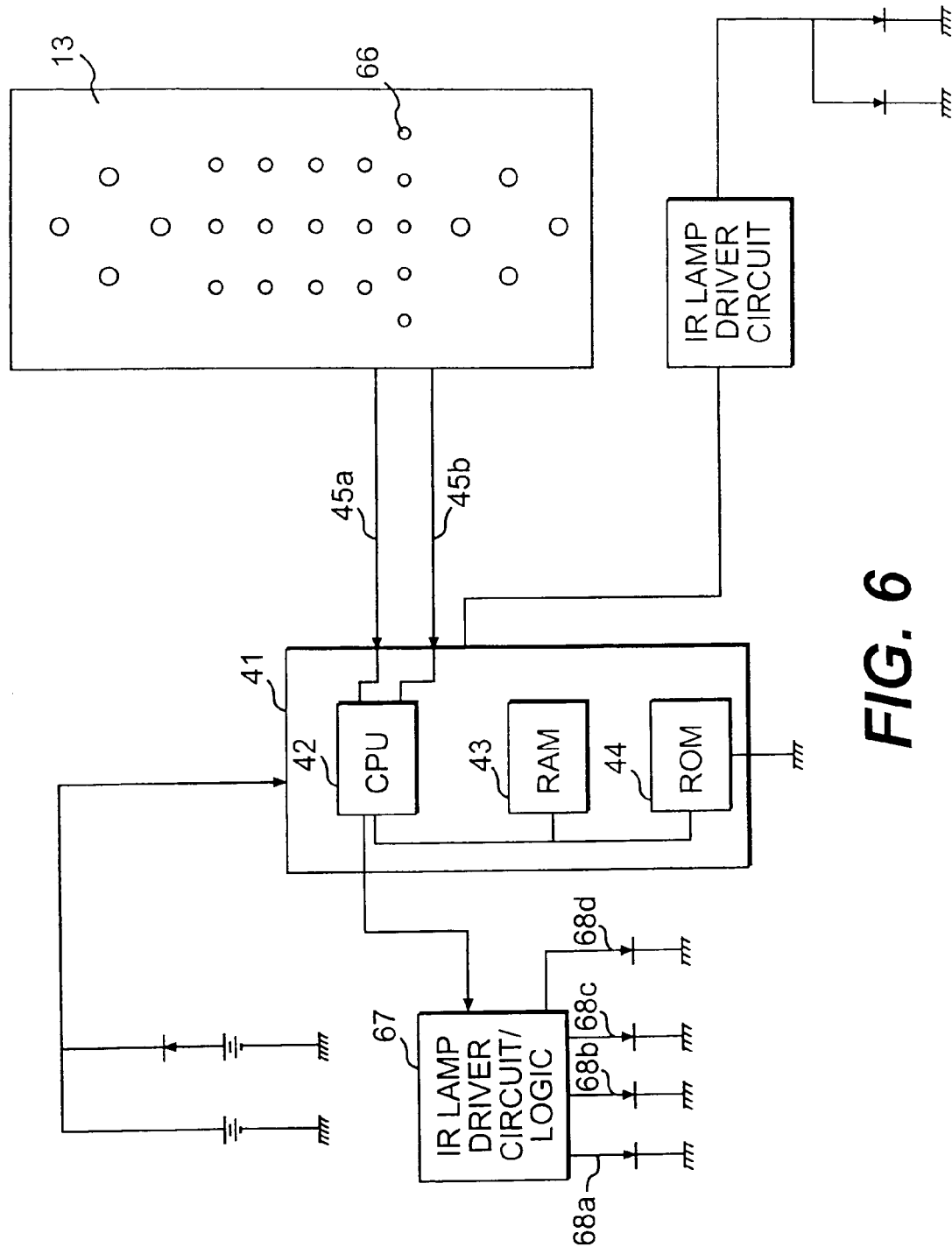

INTEGRATED REMOTE CONTROL UNIT FOR OPERATING A TELEVISION AND A VIDEO GAME UNIT

CROSS-REFERENCE TO RELATED APPLICATIONS

This application is a continuation of U.S. patent application Ser. No. 09/750,137, filed Dec. 29, 2000, and now issued as U.S. Pat. No. 6,794,992.

FIELD OF THE INVENTION

The present invention relates to a hand held remote controller unit, and more particularly, to an integrated remote controller for operating a television and a video game player unit that is used in conjunction with the television.

DESCRIPTION OF THE RELATED ART

Remote control units have long been used to facilitate users' operation of televisions, video cassette recorders (VCR), home stereos, and other associated audio/video electronic equipment. Using wireless remote control units that transmit control commands to receiver units via infrared (IR) signals, a user can perform a variety of operations, such as changing the volume or channel of a television, fast forwarding or scanning a videotape in a VCR, changing a preset radio station on a stereo receiver, or switching to a different track on a compact disc (CD) playing in a CD player, all from a distance away from the audio/video equipment. Although televisions and other assorted audio/video electronic equipment can be controlled without using a remote control, many users rely on the convenience of such hand-held portable controllers.

As different types of audio/video equipment have become operable by remote control, a need has developed for converging the capabilities of remote control units to control the operation of different types of electronic equipment by a single unit. For example, remote control units are commercially available that control the operation of a television, VCR, and cable television set-top box with a single controller, as in Darbee et al., U.S. Pat. No. 4,959,810. Some remote control units are also programmable to "learn" the IR transmission format for different brands, so that a consumer can replace the individual remote controls intended for the consumer's different types of home audio/video equipment with a single remote control unit. These remote control units can reduce the clutter and confusion associated with operating a plurality of different remote control units.

During the past few years, video game playing has become increasing popular for home entertainment as video game designers incorporate improvements to computerized graphics and special effects to create realistic video games and adventure simulations. The convergence of the Internet with television programming is also expected to bring added capabilities for video games and interactive television. For example, consumers may soon be able to participate as a contestant in television game shows, or may be able to play action or adventure games with others in different households.

Video games are typically played using one or more hand-held control units that are directly connected to a video game console through a wire. The controllers typically include a "joystick" or series of "up/down/left/right" buttons, and a few other "action" buttons for shooting, firing, jumping, selecting, etc. While some video game systems are designed for all games to be playable with the same controller, others require users to obtain specially designed controllers for certain games (e.g., a driving game may require a controller that includes a steering wheel). In either case, this adds at least one more controller that is necessary for a user to operate the components in a home entertainment system. The user must therefore use one or more remote control units to adjust the features of a television (e.g., volume, picture contrast) and a connected stereo system, and then switch to a separate video game controller for video game playing. Switching between separate controllers may be inconvenient or unwieldy, particularly if the user is frequently switching between controller units.

SUMMARY OF THE INVENTION

In view of the difficulties described above, there is a need for a method and apparatus for controlling the operation of both a television and a video gaming system with a single remote controller unit. In the preferred embodiment of the present invention, a hand-held remote control unit for controlling the operation of a television and other electronic audio/video components, such as a VCR, DVD player, or home stereo, operates in a different mode for use as a video game controller. The location and position of the push buttons on the remote controller unit are arranged such that a subset of the buttons that are for the television remote control are operable in a different mode as a video game controller. A user rotates the remote control unit from a first position to a second position to use the remote control unit for operating a video gaming system. For example, the first position could be a substantially vertical upright position, and the second position could be a substantially horizontal position. When used as a video game controller, the controller indicates which of the subset of buttons on the remote control are to be used for operating the video game.

It is an object of the present invention to provide a remote control unit for controlling a plurality of electronic audio/video applications. The remote control includes a keypad arranged for receiving input to control either a first electronic audio/video application when the remote control unit is accessed in a first position or a second electronic audio/video application when the remote control unit is accessed in a second position. A CPU within the remote control generates control signals to control an electronic audio/video application based upon input received from the keypad. A memory is connected to the CPU for storing control signal data associated with input received by the CPU. At least one transmitter transmits control signals from the CPU to an electronic device for controlling either the first or second electronic audio/video application according to the position by which the remote control unit is accessed.

It is another object of the present invention to provide a remote control unit having a plurality of pushbuttons arranged on a housing of the remote control unit for operating the remote control unit in a first hand-held position to control a first electronic device, a subset of the plurality of pushbuttons for operating the remote control unit in a second hand-held position to control a second electronic device, a CPU for receiving input from the pushbuttons and generating control signals for controlling either the first or second electronic device, and a first and second transmitter for transmitting control signals to control the respective first and second electronic devices.

It is yet another object of the present invention to provide a remote control unit having a plurality of pushbuttons arranged on a housing of the remote control unit for operating the remote control unit to control a first electronic device, a subset of the plurality of pushbuttons for operating the remote control unit to control a second electronic device. A CPU receives input from the pushbuttons and generates control signals for controlling either the first or second electronic device. A transmitter transmits control signals to control the respective first and second applications. An illuminating display on the housing lights pushbuttons on the remote control unit, wherein only the subset of pushbuttons for controlling the second application of the electronic device are illuminated.

It is also an object of the present invention to provide a method for controlling access to operation of video games. A controller unit is provided to users for operating video games on video game consoles, wherein the controller unit includes a keypad with a plurality of keys for controlling the operation of video games. Face plates are designed that are removably attachable to the controller keypad for operating different video games, wherein each face plate covers keys on the keypad that are unnecessary for controlling a particular video game, and the face plate provides an access code to the controller when attached to the keypad for accessing operation of the particular video game.

BRIEF DESCRIPTION OF THE DRAWINGS

FIG. 6 is a schematic electrical circuit diagram of the remote control according to the alternative embodiment of FIG. 5.

DETAILED DESCRIPTION OF THE PREFERRED EMBODIMENTS

The preferred embodiment of the present invention provides a method and apparatus for controlling the operation of both a television and a video gaming system with a single remote controller unit.

Figure 1:
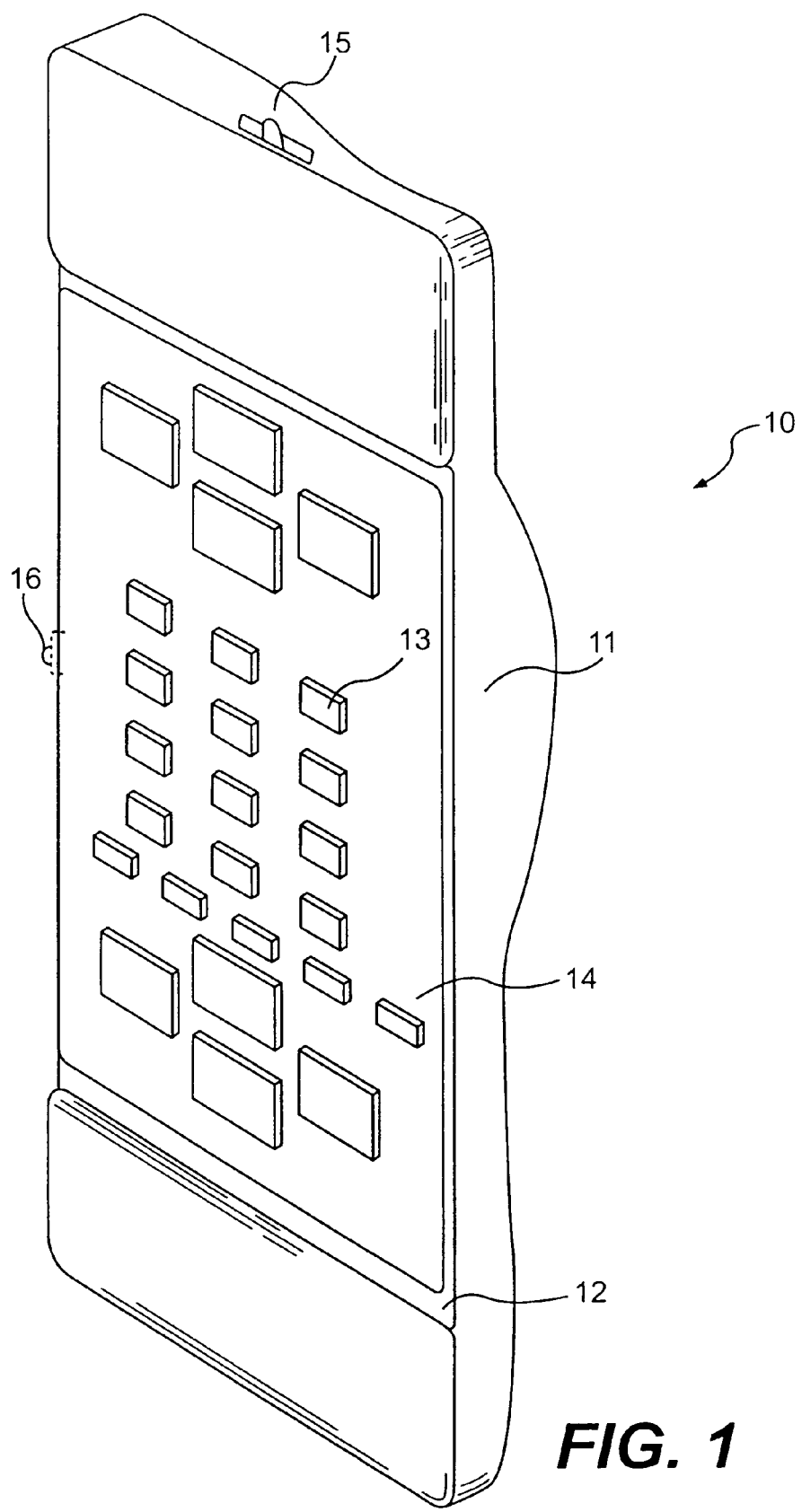
FIG. 1 is a front perspective view of a remote control according to a preferred embodiment of the present invention.

The present invention will now be described in more detail with reference to the figures. FIG. 1 is a perspective view of remote controller unit 10 according to the preferred embodiment of the present invention. As shown, the remote control unit 10 includes a housing 11 and a base panel 12 with openings for receiving elastomeric pushbuttons for keypad 13, extending therefrom. Face plate 14 overlays a portion of the base panel on the outer surface thereof. The function that is assigned to each pushbutton for controlling a television or another electronic audio/video component is labeled on the face plate. LEDs 15 and 16 transmit infra-red (IR) signals to control a television or other audio/video devices.

Figure 2:
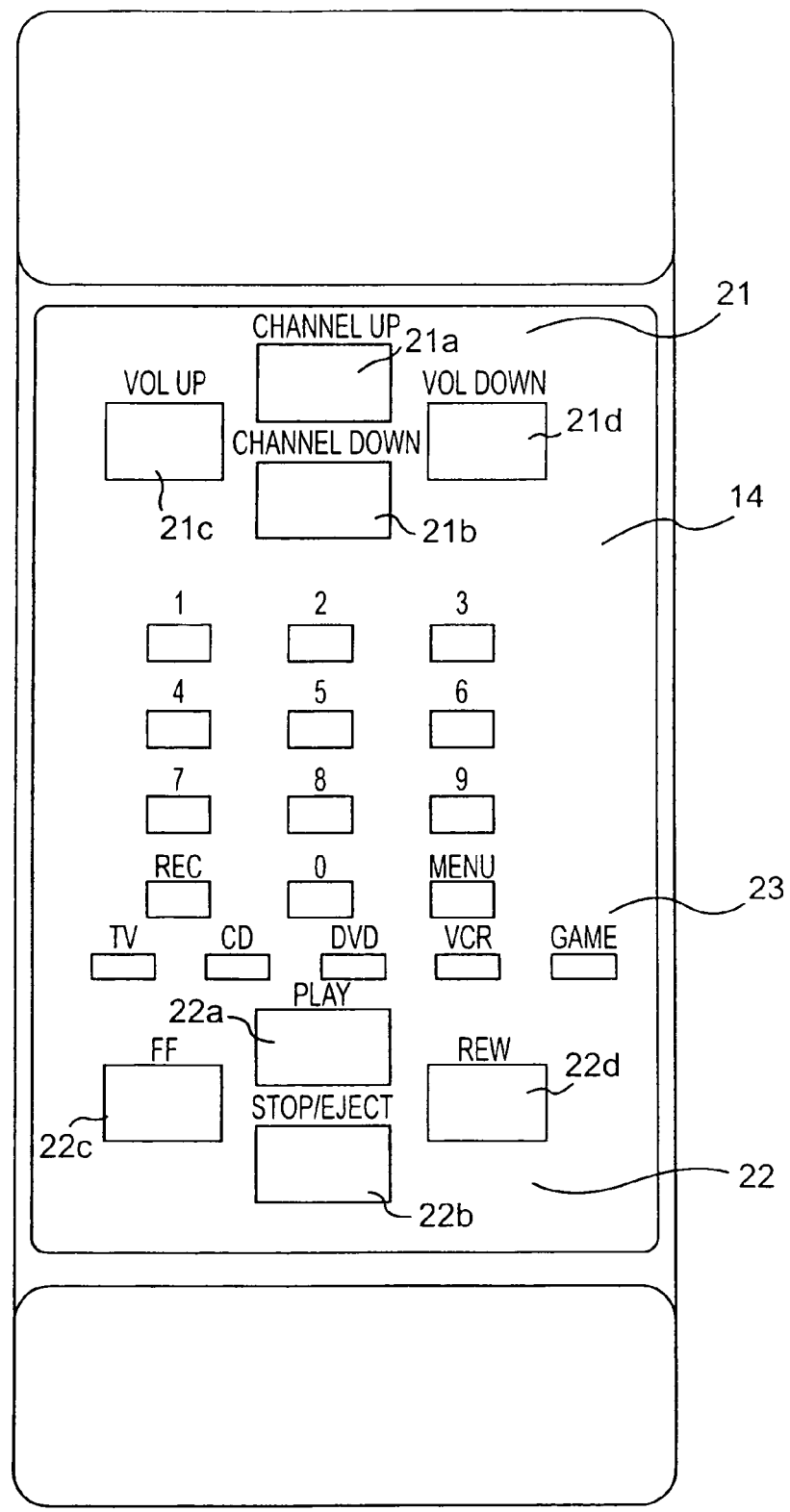
FIG. 2 is a schematic diagram of a front view of a face plate for the remote control unit of FIG. 1.

An arrangement of pushbuttons for the remote control and the face plate label for controlling a television and other audio/video components is shown in greater detail in FIG. 2. As can be seen, pushbuttons 21 are grouped together as four buttons that are contiguous to one another as a set. Face plate 14 indicates that these pushbuttons control "channel up" 21a, "channel down" 21b, "volume up" 21c, and "volume down" 21d. Pushbuttons 21 can be used for controlling the volume and/or the channel of a television, radio receiver, or VCR. Pushbuttons 22 are also grouped together as four contiguous buttons located toward the lower side of the base panel 12. These pushbuttons control "play" 22a, "stop/eject" 22b, "fast forward/scan forward" 22c, and "rewind/scan reverse" 22d. Pushbuttons 22 can be used for operating a VCR, a DVD player, or a CD player.

The set of push buttons 23 control whether the remote control is operating in a mode for controlling the television ("TV"), video cassette recorder ("VCR"), compact disc player ("CD"), digital video disc player ("DVD"), or video game system ("Game"). As an alternative, a toggle control can be operated by a switch on the side of the remote controller unit.

Figure 3A:
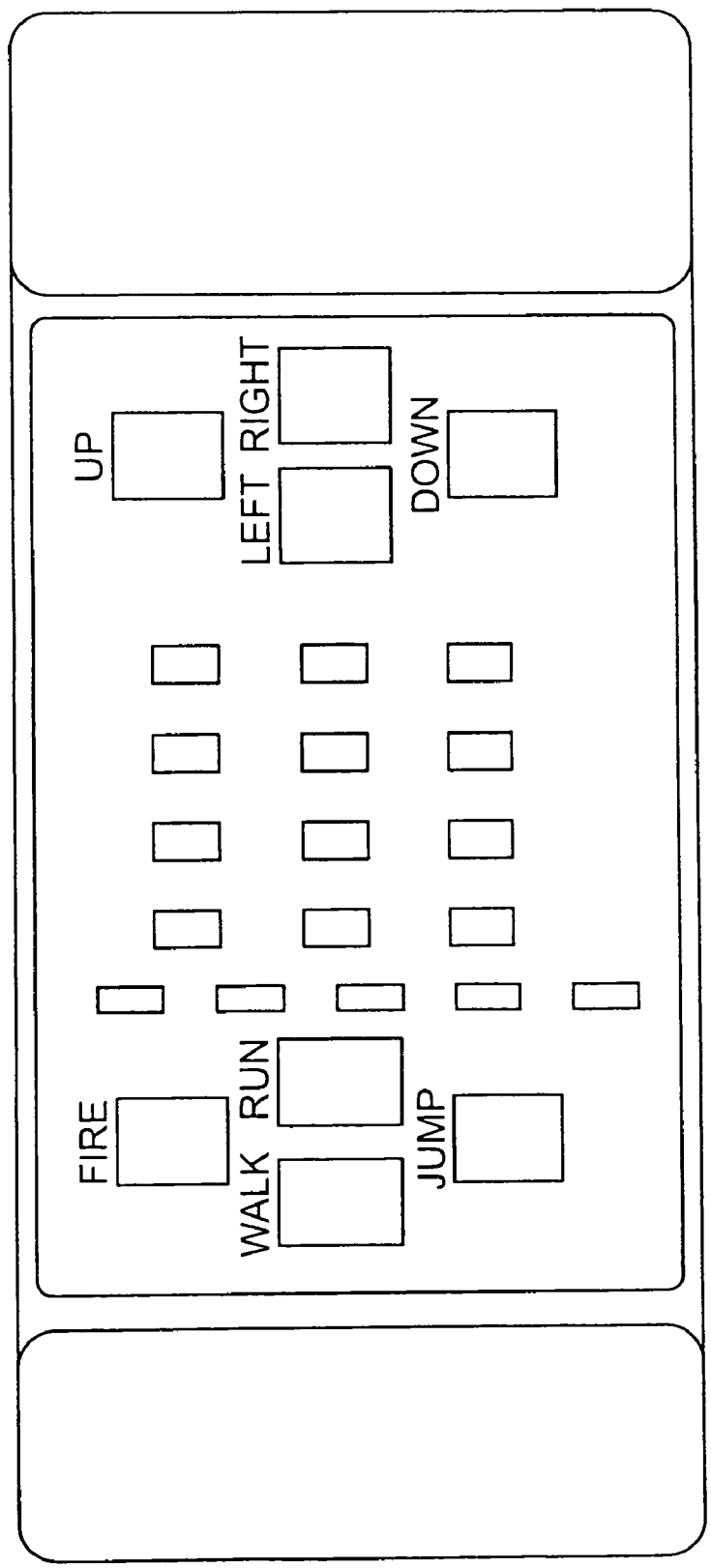
FIG. 3A is a schematic diagram of a front view of a face plate for the remote control of FIG. 1 in a horizontal position.

FIG. 3A provides an orthogonal view of the remote controller unit 10. The hand-held controller is held by a user in an upright or vertical position to control a television, VCR, CD player, or DVD player. When the remote controller is used for playing video games, it is held in the horizontal position as shown in FIG. 3A, such that the width of the unit is greater than its height. As can be seen, one of the two sets of four contiguous pushbuttons 21, 22 can be utilized for manipulating the position of a character in a video game (up, down, left, right), and the other can be used to select the activities or events associated with the game (shoot, jump, select, etc.). Depending upon the configuration of the game or the game console design, other keys in the keypad (e.g., the pushbuttons for the "1", "4", and "7" keys) may also be activated for use when in the "game" mode.

Figure 3B:
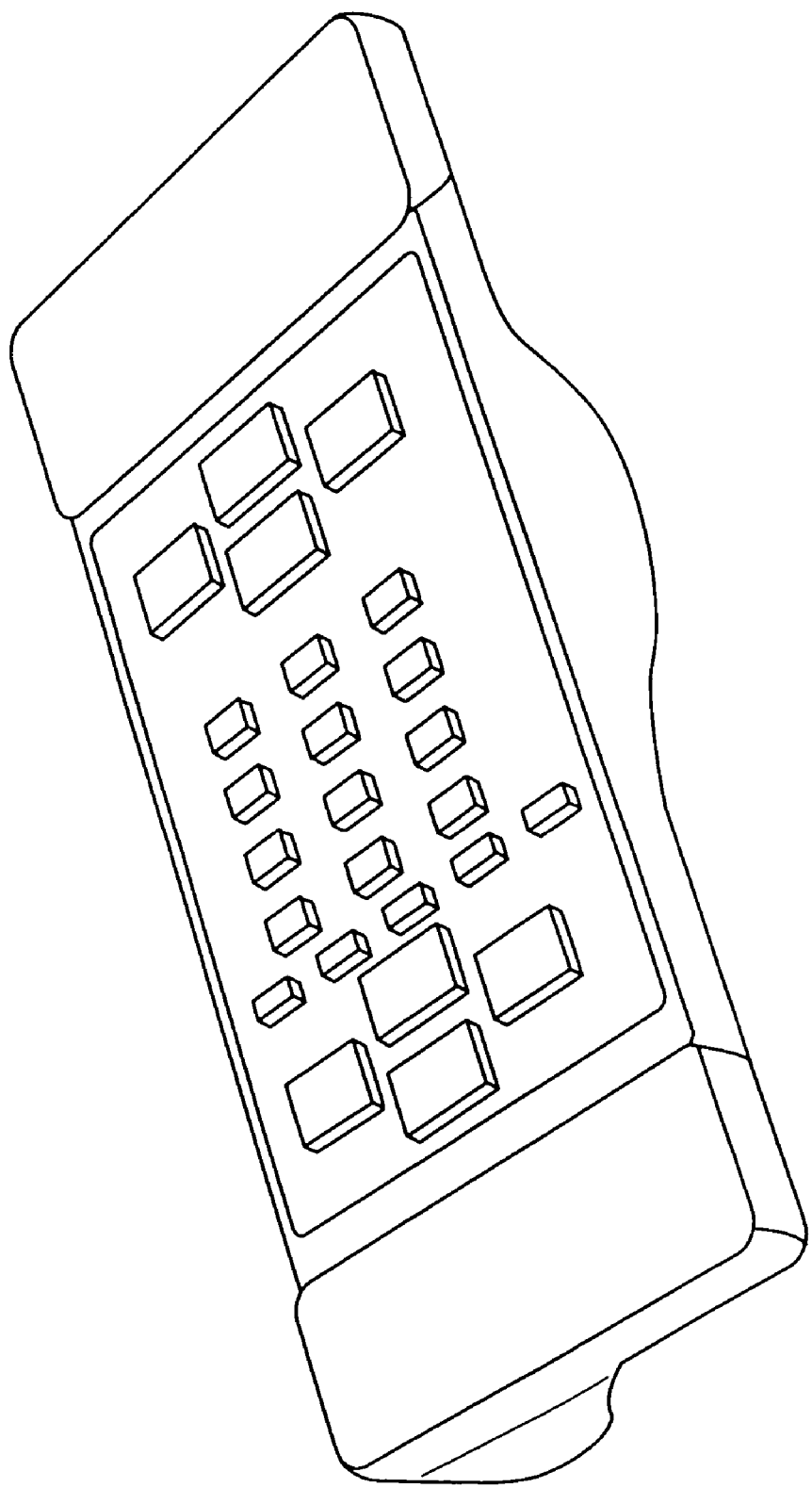
FIG. 3B is a side perspective view of the remote control of FIG. 1.
Figure 3C:
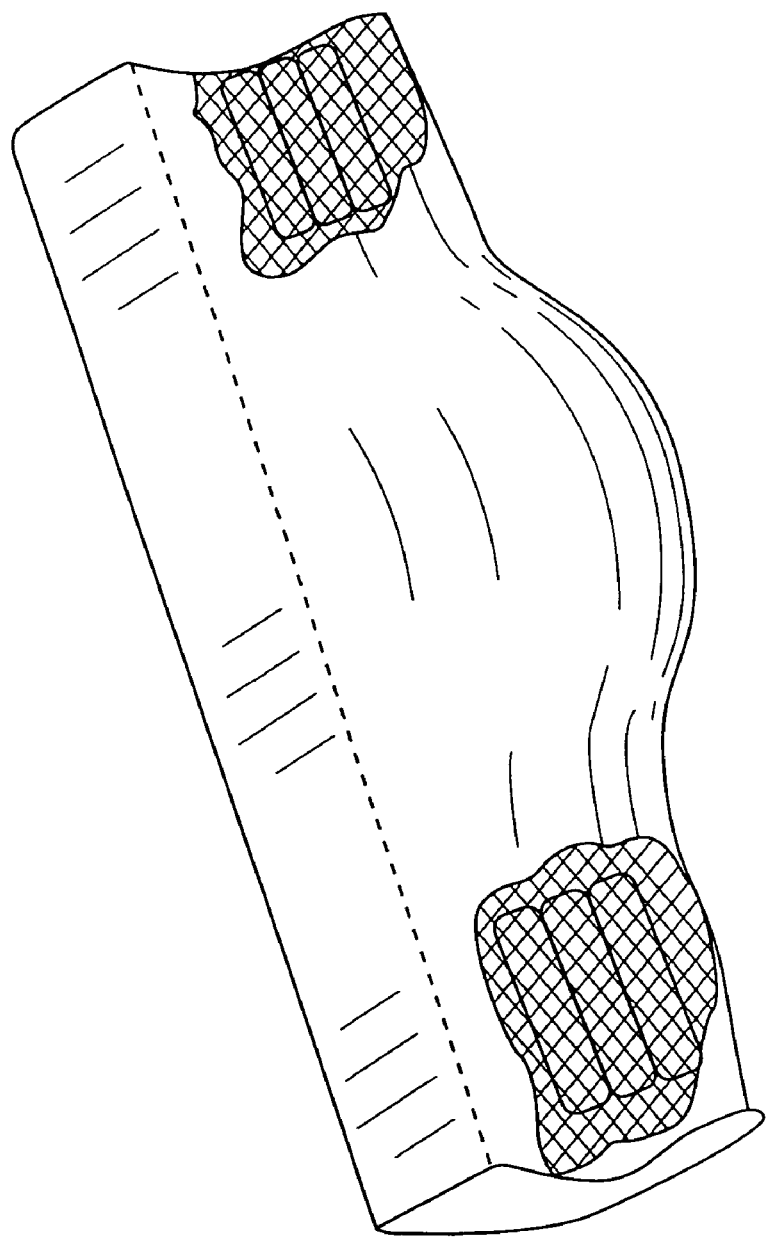
FIG. 3C is a rear perspective view of the remote control of FIG. 1.

As shown in FIG. 3B, the sides of the remote control unit when positioned in the horizontal position are ergonomically shaped to conform to the position of hands and fingers when playing a video game. FIG. 3C is a rear-side orthogonal view of the remote control. The indentations in the shape of the sides of the remote control and the bump-out in the center-edge of the remote control allow the unit to be held easily by a user in the orthogonal position.

Figure 4:
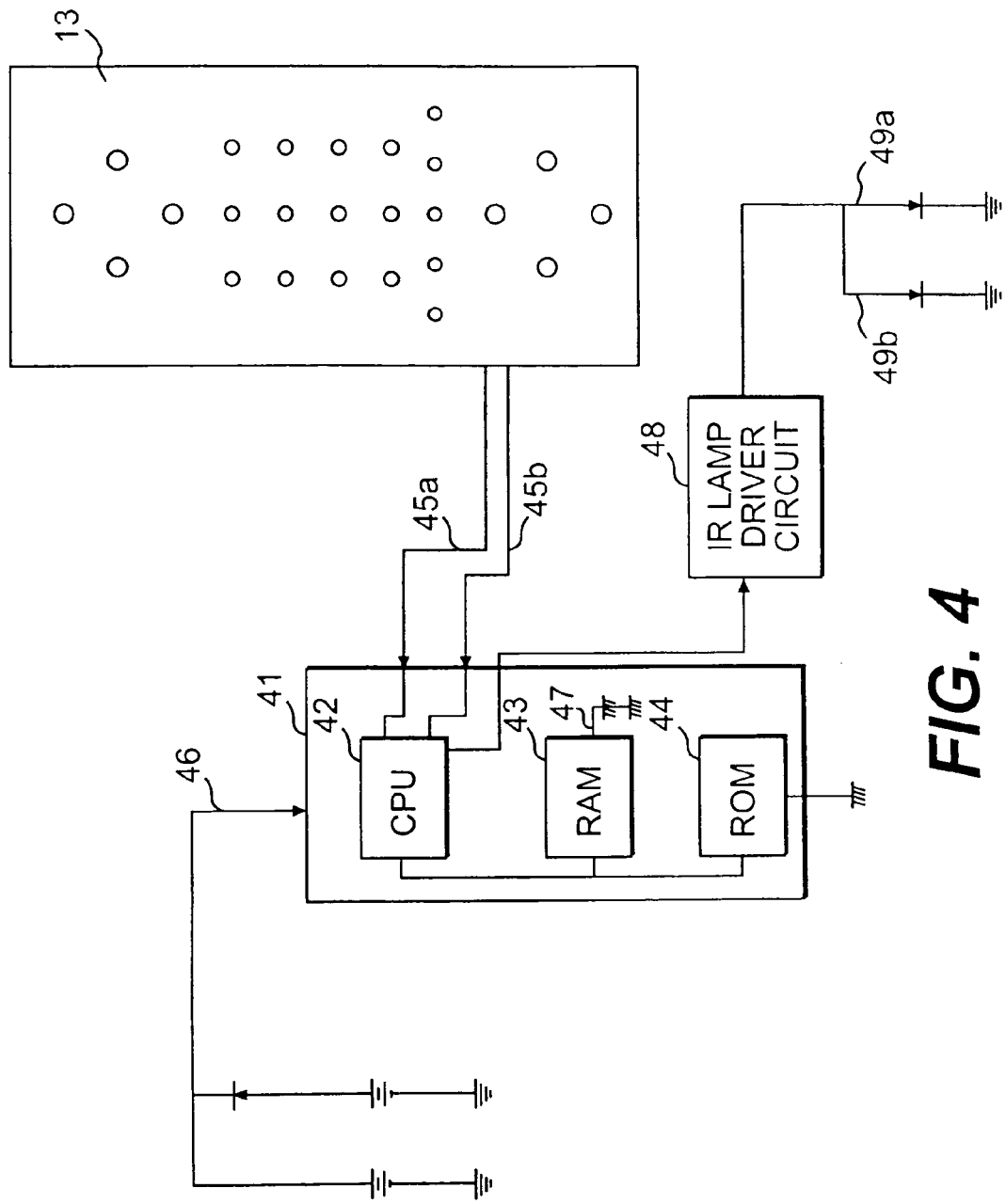
FIG. 4 is a schematic electrical circuit diagram of the remote control according to a preferred embodiment of the present invention.
Figure 5:
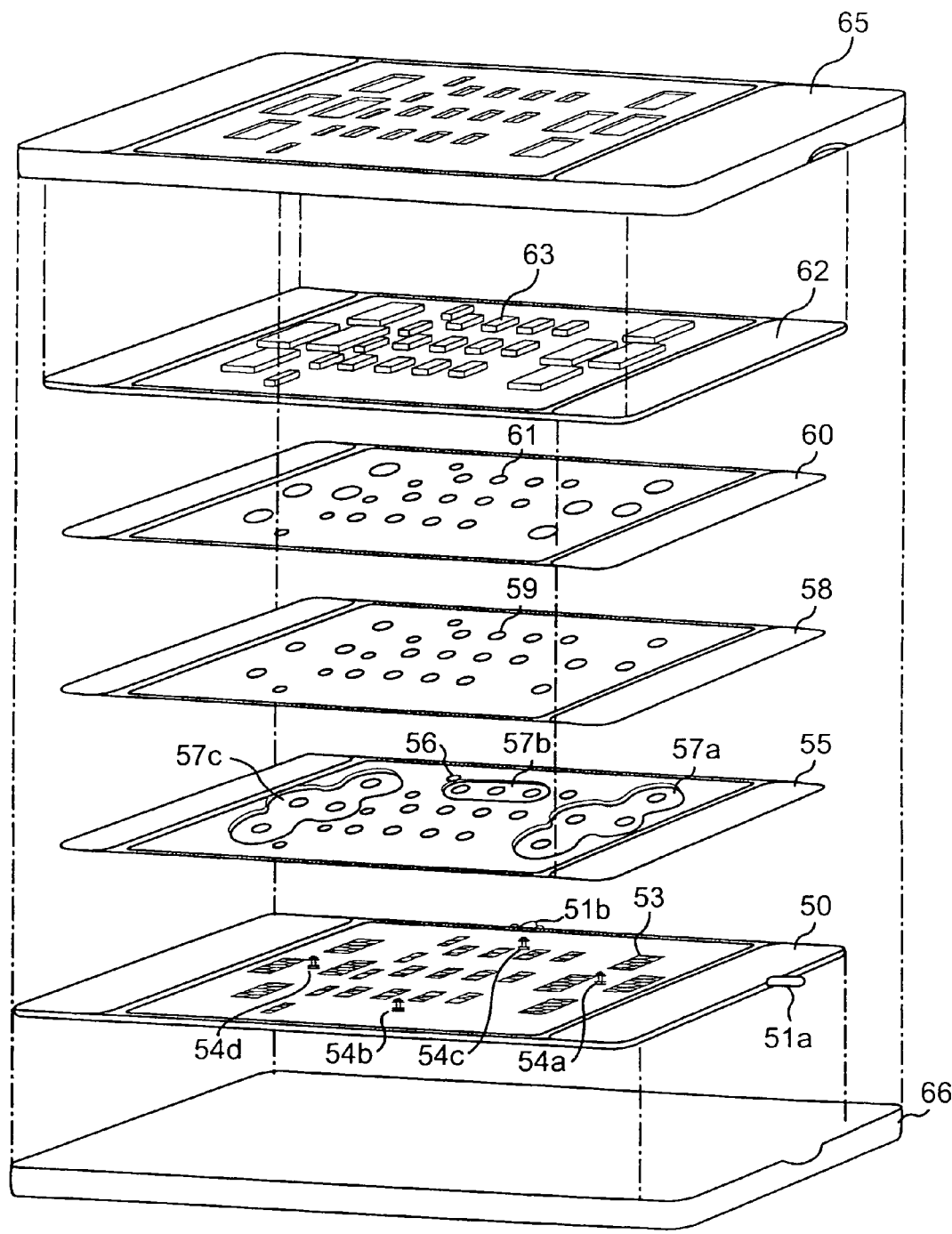
FIG. 5 is an exploded angular view of the remote control according to an alternative embodiment of the present invention.

FIG. 4 provides a schematic diagram of the operating circuitry in the remote control unit according to the present invention. The electrical circuitry is generally of the type disclosed in O'Donnell et al., U.S. Pat. No. 5,414,426, and in FIG. 9 of Darbee et al., U.S. Pat. No. 4,959,810, the disclosure of both of which are incorporated herein by reference. Remote control 10 includes a microprocessor 41, which includes central processing unit (CPU) 42 and memory including RAM 43 and ROM 44. Keypad 13 is connected to CPU 42 by an interrupt line 45a and a bus 45b. A battery power supply 46 also connects to CPU 42. Backup battery 47 maintains the data in RAM memory 43. The output of the CPU 42 is connected to one or more LEDs and lamp drivers 48, which transmits an infra-red signal to infra-red receivers on the electronic audio/video components to be controlled, as shown by LEDs 15 and 16 in FIG. 1. When the remote control held in a vertical position for use in controlling a television, VCR, DVD player, CD player, etc., the IR Lamp Driver Circuit 48 drives LED 49a, located at the top edge of the remote control unit. When the remote control is held in the horizontal position for controlling a game console, the lamp driver 48 drives LED 49b, which is located along the side edge of the remote control unit. The two LEDs are positioned such that the infra red light will be directed toward a receiver in an entertainment console unit. The relative positioning of the two LEDs, 51a and 51b on a circuit board 50 for a remote controller unit is shown in FIG. 5.

The operating programs for the remote control 10 that are stored in RAM 43 and ROM 44 are similar to the operating programs disclosed in U.S. Pat. Nos. 4,959,810 and 5,414, 426, with the exception of the video game operation and programming for selectively illuminating the operative keys, as will be described below.

When a user presses the pushbutton 23 for "Game," CPU 42 receives a signal to load the keypad configuration for the remote control unit from ROM 44 for the video game mode. As described with reference to FIG. 3A, pushbutton sets 21 and 22 may be activated in this mode, and, depending upon the particular configuration, the pushbuttons for "1", "4" and "7" also may be activated. Correspondingly, if pushbutton "2" is depressed in the video game mode, the CPU will ignore this activity. By holding the remote control in the orthogonal direction and using the selected subset of pushbuttons designated for the video game mode, a user can use the remote controller unit for playing video games or for participating in interactive television. On the right side of the controller, the pushbuttons of pushbutton set 21 are labeled "Up" 21a, "Down" 21b, "Left" 21c, and "Right" 21d, above the top of the pushbuttons. As can be seen, the commands for controlling a television, namely, "Channel Up," "Channel Down," "Volume Up," and "Volume Down," are now shown to the side of the pushbuttons. On the left side of the controller, the pushbuttons of pushbutton set 22 are labeled "Fire" 21a, "Jump" 21b, "Walk" 21c, and "Run" 21d, above the top of the pushbuttons.

In a first alternative embodiment, the remote controller of the present invention selectively illuminates the pushbuttons that are operative for the designated mode. In the "game" mode, the only buttons that are illuminated are those for pushbutton sets 21 and 22, and perhaps the pushbuttons for the "1", "4", and "7" keys. Assuming that the remote control is being used in a darkened room, only the illuminated keys will be viewable by the user. Even in a normally lighted room, the illuminated keys will be more easily viewable by the user.

The configuration of LEDs for selectively illuminating a subset of the pushbuttons on the remote control is shown in FIG. 5. The remote controller unit is constructed of a circuit board 50, an insulating plate/light separator 55, a contact plate 58, a pushbutton plate 60, a lower housing 62 and an upper face plate 65. Above the lower housing casing 66, circuit board 50 is imprinted with a plurality of contacts 53 that are positioned directly beneath the remote control pushbuttons. The circuit board additionally includes four LEDs, 54a, 54b, 54c, and 54d, which protrude from the circuit board and are connected with lighting circuits on the circuit board. The circuit board additionally includes an LED 51a at the tip of the remote control unit and a second LED 51b at a side edge of the unit, each for transmitting IR signals to a receiver.

An insulating plate 55 with holes 56 is positioned directly above the circuit board 50. The insulating plate includes three separator walls, 57a, 57b, and 57c. The separator walls surround a subset of the plurality of holes 56, and block any light emitted from LEDs 54a, 54b, 54c, and 54d from penetrating beyond the holes encircled by the walls. Contact plate 58 is positioned directly above the insulating plate 55 and has a plurality of contacts 61 to electrically contact with contacts 53 on the circuit board 50.

A translucent pushbutton projection fixing, locating or guiding plate 60 with holes 61 is positioned above the contact plate 58. Transparent or translucent plate 62 is then seated on the pushbutton fixing plate 60, and has a plurality of pushbutton protrusions 63 that extend upwardly through holes in the upper casing 65.

FIG. 6 is a schematic diagram of the microprocessor 41 of FIG. 4 with additionally connected circuitry for providing illumination within the remote controller unit 10, for use in an alternative embodiment of the present invention. When the pushbutton marked as "Games" is depressed on keypad 13, contact 66 electrically contacts the corresponding contact on the circuit board, sending a signal through interrupt line 45a and bus 45b to CPU 42 to load the "game mode" configuration from ROM 44. CPU 42 then retrieves an instruction from CPU 42 to drive a subset of LED backlights 68a, 68b, 68c, or 68d to illuminate activated pushbuttons that correspond with the "game mode." Because the separator walls 57a, 57b, and 57c, on the insulating plate 55 prevent the light emitted from the LEDs from penetrating beyond the selected pushbuttons, the remote controller unit 10 of an alternative embodiment present invention selectively illuminates only those pushbuttons 63 that are activated for the "game mode."

It is also possible to configure CPU 42 and ROM 44 to send instructions to illuminate only certain pushbuttons when the remote controller unit is used in other modes. For example, the pushbuttons for "play" 22a, "stop/eject" 22b, "fast forward" 22c, and "rewind" 22d, are not active when the remote control is used to control the features of a television. Accordingly, the remote control can be configured such that these translucent push buttons are not illuminated when the remote control is in the "TV" mode.

As another alternative embodiment, the remote controller unit can include an LCD display above or beside each pushbutton, and can be programmed to display a descriptive indicator for each pushbutton that is activated. The LCD display can be backlit for clearer illumination in a darkened room. The LCD display may be used in conjunction with a series of push-buttons (e.g., above or below the actual buttons), or may be used as a display beneath a touchscreen surface, to be operated by pressing fingers against the screen or a special pointer device, as in many conventional personal digital assistant devices (PDA's) such as the Palm Pilot™ systems.

Figure 7A:
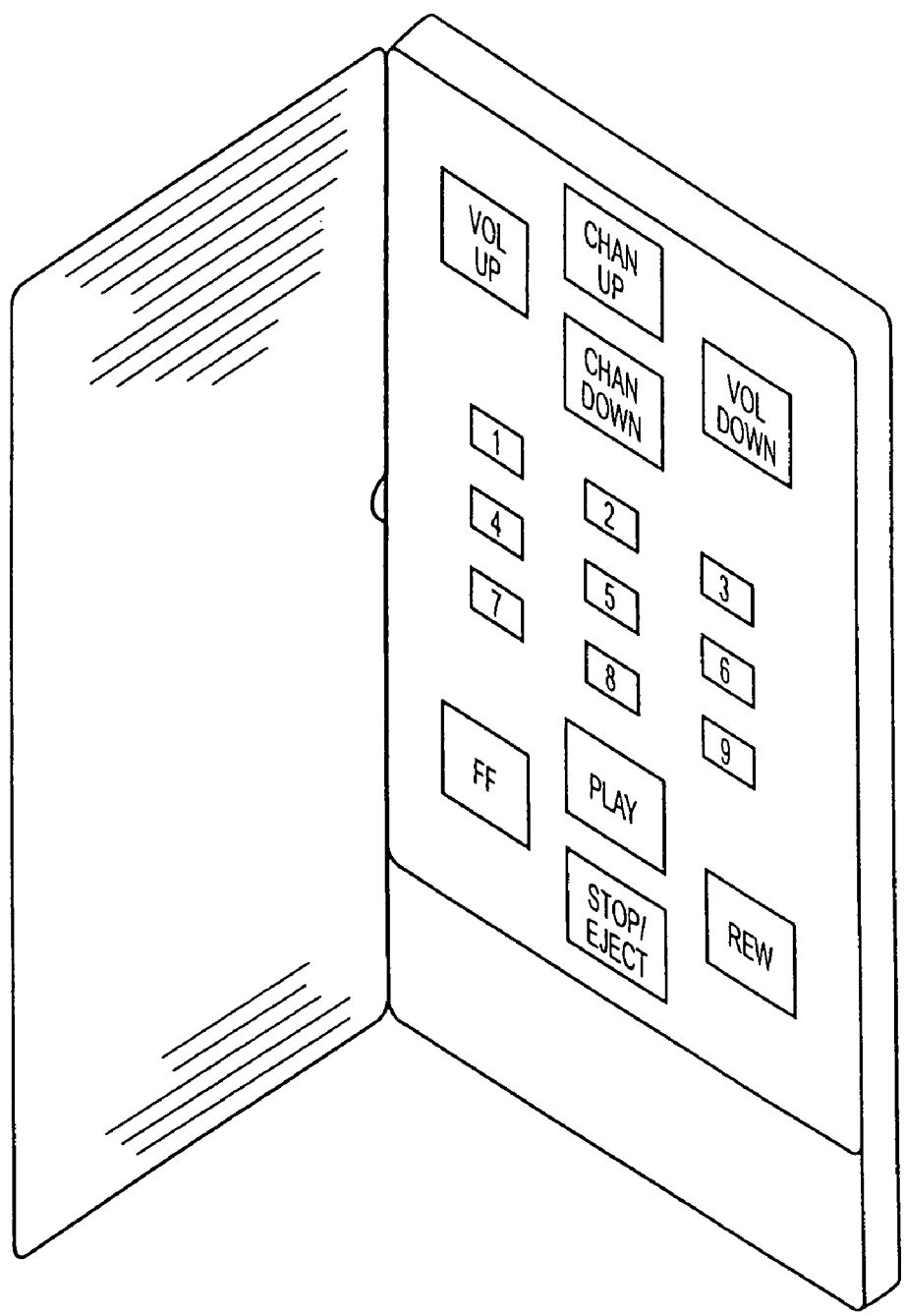
FIG. 7A is a front perspective view of a remote control unit according to an alternative embodiment of the present invention.
Figure 7B:
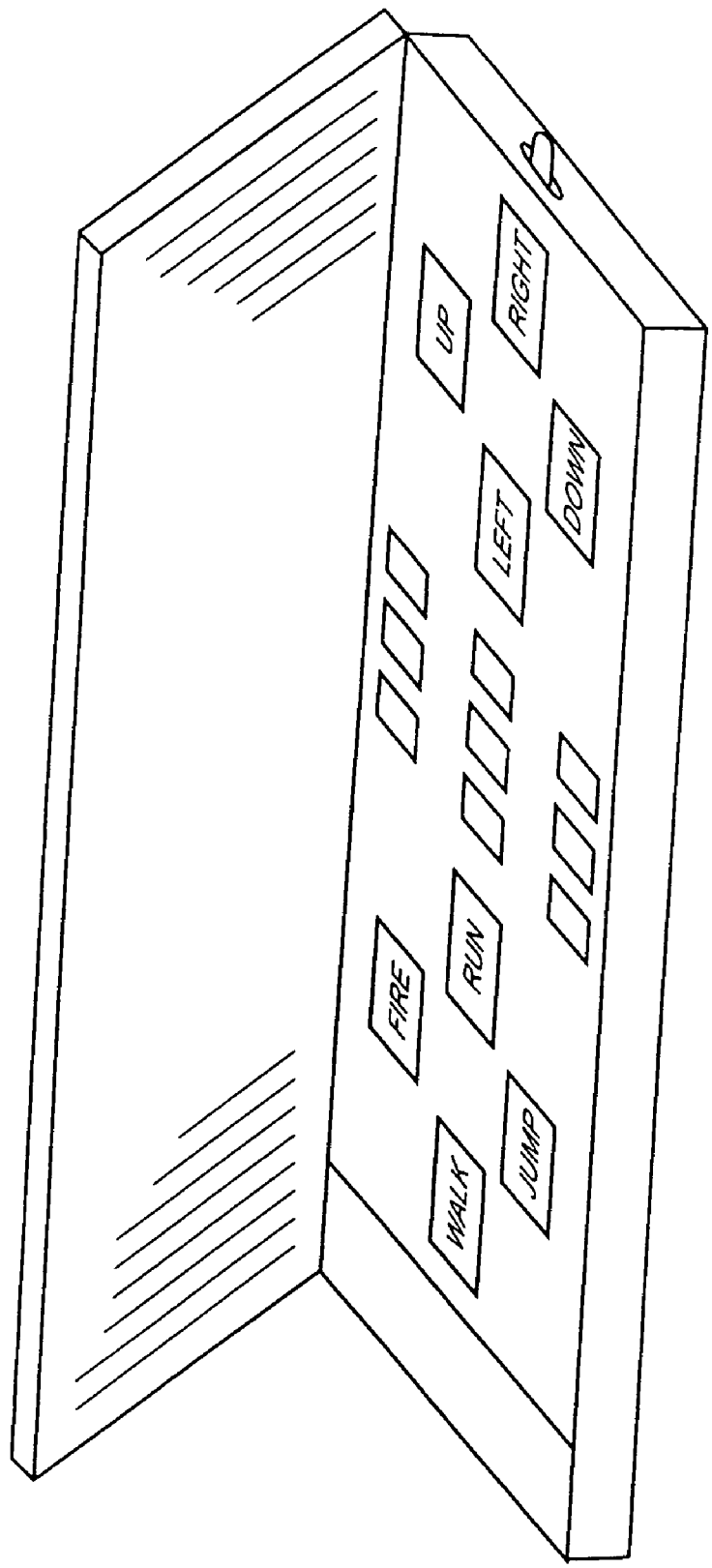
FIG. 7B is a perspective view of a remote control unit according to the alternative embodiment of FIG. 7A in a horizontal position.
Figure 7C:
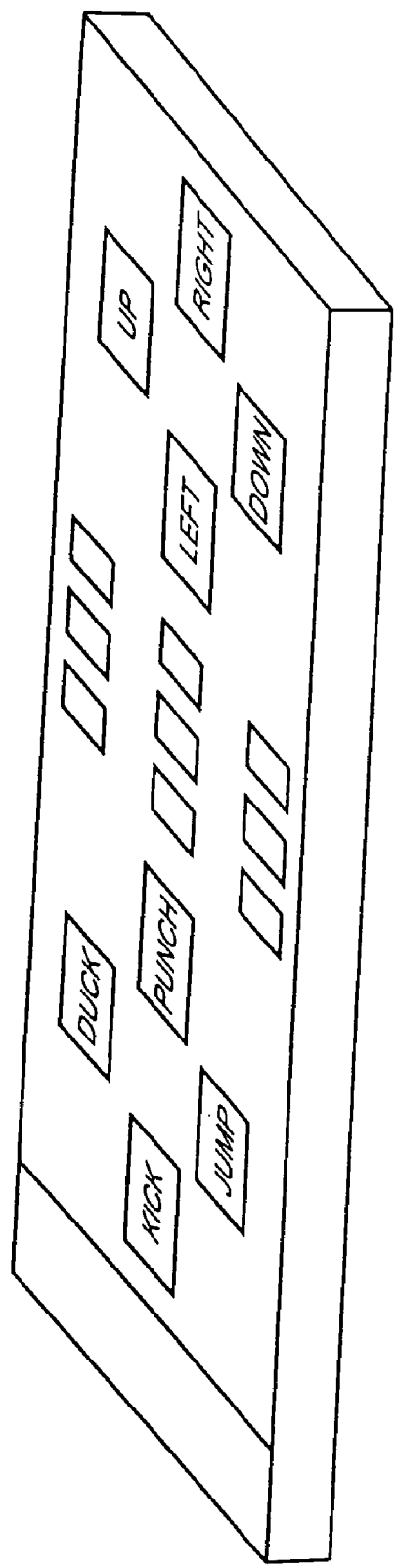
FIG. 7C is a perspective view of a remote control unit according to the alternative embodiment of FIG. 7A in a horizontal position.

FIGS. 7A, 7B, and 7C provide an illustration of a remote control unit configured within a multi-function, personal digital assistant. As shown in FIG. 7A, the LCD display provides a touch screen display for a television/VCR remote control, to be operated in the upright position. In FIG. 7B, different text is displayed within the LCD display, perpendicular to the text displayed in FIG. 7A to control a game console when the unit is held in the horizontal position. FIG. 7C illustrates an example in which different text is provided on the left-side of the display for use in controlling the operation of a different type of game. In this "karate" game, the "fire," "walk," and "run" input keys are replaced with "duck," "kick," and "punch."

Figure 8:
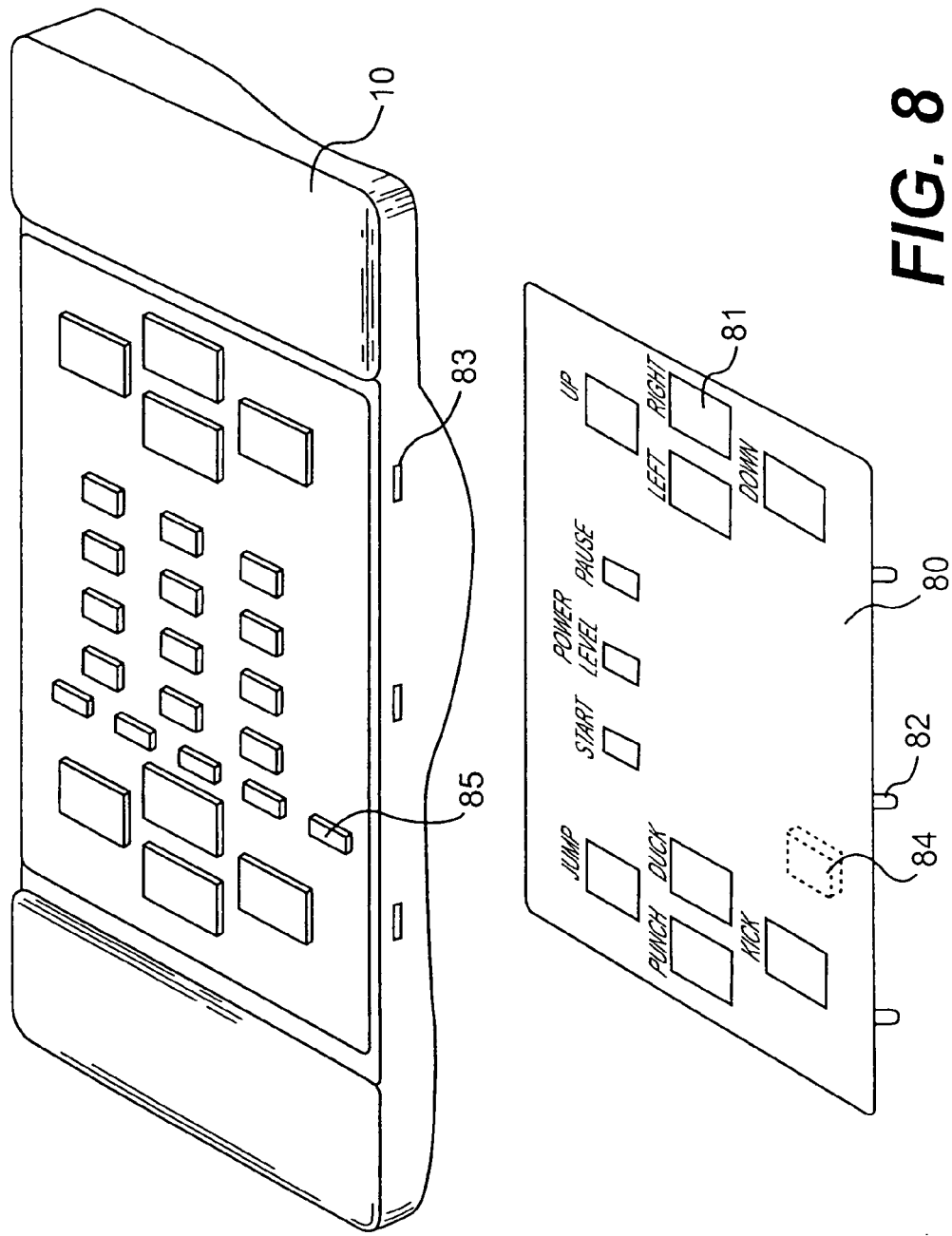
FIG. 8 is a front perspective view of a remote control unit and a detachable face plate according to an alternative embodiment of the present invention.

As an alternative embodiment to selectively illuminating the activated pushbuttons, the remote control system can be designed to be fitted with removable face plates that expose only the activated pushbuttons for particular modes of operation for the remote control. FIG. 8 illustrates a removable face plate 80 to be affixed to remote control 10. As can be seen, the face plate 80 has a plurality of holes 81 that expose pushbuttons for only a selected subset of pushbuttons on remote control 10. The face plate 80 also contains text or graphics imprinted above or beside the holes to indicate the purpose or function of the exposed push buttons when in operation. The face plate 80 connects to the remote control 10 through a series of connectors 82, which attach to slots 83 at both sides of the remote control 10 on the housing such that the face plate is removably affixed to the remote controller unit. Accordingly, when the face plate 80 is attached to the remote control 10, the remote control appears such that the remote control is designed exclusively for use for the video gaming system.

In another alternative embodiment, the face plate 81 can have a protrusion on the underside of the face plate body, shown in phantom lines as element 84, to press against the "Games" pushbutton 85 and load the ROM 43 code for activating the pushbuttons for controlling the game console. In such a system, the CPU may be configured to require the "Games" pushbutton to be continually depressed, as would occur when the face plate 80 is affixed to the remote control unit 10.

Face plates can also be designed to be interchangeable to accommodate the play of different types of games in the game console. For example, while the face plate shown in FIG. 8 may be appropriate for a "karate" or martial arts-type of action game, the "jump," "kick," "duck," and "punch" keys may not be appropriate for other types of games. Therefore, a different type of face plate may be available for purchase for each type of video game.

Figure 9A:
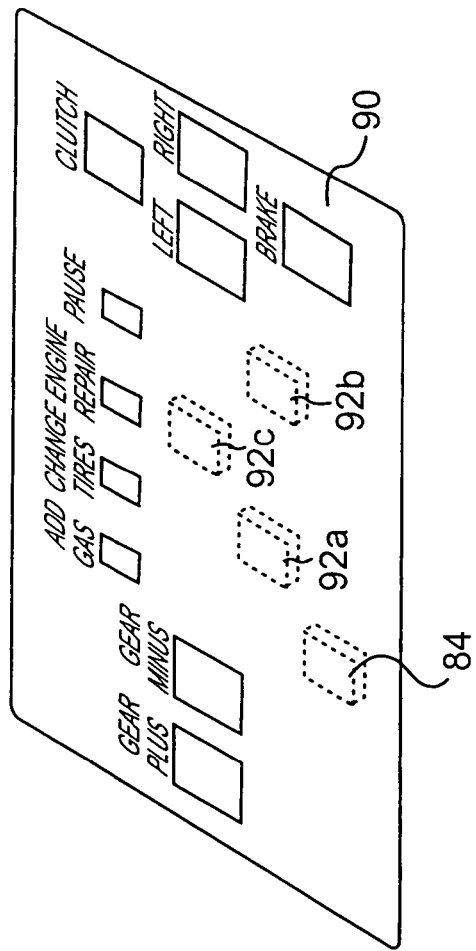
FIG. 9A is a detachable face plate according to the alternative embodiment of FIG. 8.
Figure 9B:
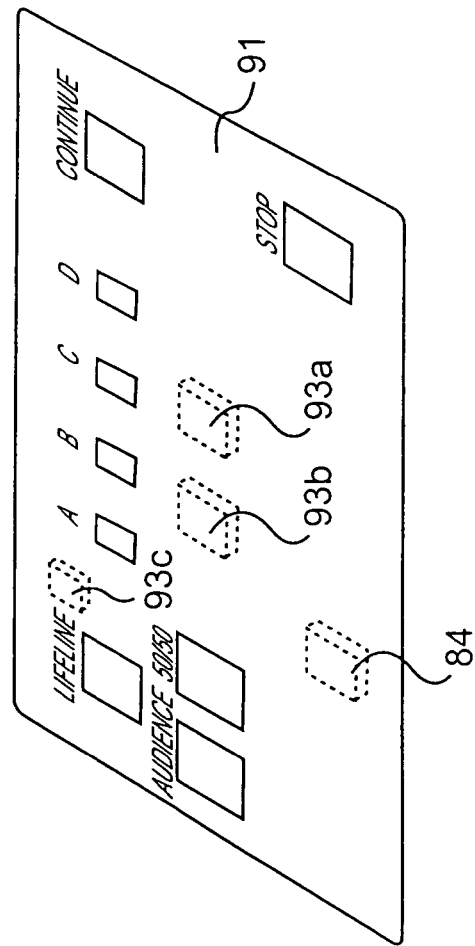
FIG. 9B is a detachable face plate according to the alternative embodiment of FIG. 8.

FIG. 9A provides an illustration of a face plate that may be suitable for play for a driving/racing-type of game. Some of the pushbuttons that are active for the "karate" game illustrated with reference to face plate 80 in FIG. 8 are not utilized for the racing game that uses face plate 90. The face plate 90 is also labeled differently to reflect the differences in how the game is played. FIG. 9B provides another illustration of a face plate that is suitable for playing a different type of game. In this case, face plate 91 is configured for playing a television-style quiz-show.

Face plates 90 and 91 as shown in FIGS. 9A and 9B additionally include a series of protrusions on the underside of the face plate body, in addition to the protrusion 84 that depresses the "Games" pushbutton when connected to the remote controller unit. These additional protrusions may serve two possible purposes. These protrusions may activate a code to the CPU 42 to indicate the type of game that is to be played, so that the CPU can retrieve the appropriate code from memory to activate the proper pushbuttons. Secondly, the code may required by the CPU as an access mechanism. By requiring a code, a user can only play game for which he has the appropriate face plate. In this manner, the game manufacturer can reduce the instances of software piracy, by requiring a user to purchase a face plate before playing a game.

Accordingly, the remote controller unit of the present invention allows a user to control a television, several other types of electronic audio/video equipment, and a game console, all with a single remote controller unit. The pushbuttons on the remote controller unit can be selectively illuminated to indicate the pushbuttons that are activated in each mode of operation of the controller. The remote controller unit can also be configured within a touchscreen LCD display, in which the text within the graphical keypad changes for each mode. Finally, the remote controller unit can be configurable with one or several types of removably fixable face plates. These face plates can indicate the assignment of particular push buttons on the remote controller unit for a game, and provide an access code required by the CPU in order to gain access and play a game.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A remote control unit, comprising:
   (a) a keypad having a plurality of keys on a remote control housing arranged for receiving an input;
   (b) a CPU for generating control signals to control multiple applications based upon the input received from the keypad;
   (c) a memory connected to the CPU for storing control signal data associated with the input received by the CPU;
   (d) at least one transmitter for transmitting control signals from the CPU; and
   (e) multiple removable face plates, with each face plate corresponding to each application, wherein each face plate covers keys that are not activated for the corresponding application.

2. The remote control unit according to claim 1, wherein each face plate exposes keys that are activated for the corresponding application.

3. The remote control unit according to claim 1, wherein at least one of the multiple applications is a video game, and a face plate covers keys on the keypad that are unnecessary for controlling the video game.

4. The remote control unit according to claim 1, wherein each face plate provides an access code to the CPU.

5. The remote control unit according to claim 1, wherein when each face plate is attached to the keypad, and the face plate provides an access code to the CPU.

6. The remote control unit according to claim 1, wherein each face plate comprises a hole that exposes a pushbutton on the keypad.

7. The remote control unit according to claim 1, wherein each face plate includes text or graphics that indicate a purpose or function of an exposed pushbutton.

8. The remote control unit according to claim 1, wherein each face plate indicates to the CPU an application to which the face plate corresponds.

9. The remote control unit according to claim 1, wherein at least one of the multiple applications is a video game, a face plate corresponds to the video game, and the face plate indicates the video game to the CPU.

10. The remote control unit according to claim 1, further comprising a connector that connects a face plate to the remote control unit.

11. The remote control unit according to claim 1, wherein a face plate comprises a protrusion that depresses a key on the keypad.

12. The remote control unit according to claim 1, wherein a face plate comprises a protrusion that depresses a key on the keypad, the depressed key sending a code to the CPU.

13. A remote control unit, comprising:
- a plurality of pushbuttons arranged on a housing of the remote control unit for operating the remote control unit in a first position to control a first electronic device and for operating the remote control unit in a second position to control a second electronic device, the second position having a different orientation from the first position;
- a CPU for receiving input from the pushbuttons and generating control signals for controlling either the first or second electronic device; and
- at least one transmitter for transmitting control signals to control the respective first and second electronic devices.

14. The remote control according to claim 13, wherein the at least one transmitter comprises a light emitting diode.

15. The remote control according to claim 13, wherein the second position is orthogonal to the first position.

16. The remote control according to claim 13, wherein the plurality of pushbuttons comprises a subset of pushbuttons that are activated in the second position.

17. The remote control unit according to claim 13, wherein the first position controls an operation of a television, and the second position controls an operation of a video game system.

18. A remote control unit, comprising:
- (a) a plurality of pushbuttons arranged on a housing of the remote control unit for operating the remote control unit in a first position to control a first electronic device;
- (b) a subset of the plurality of pushbuttons for operating the remote control unit in an orthogonal second position to control a second electronic device;
- (c) a CPU for receiving input from the pushbuttons and generating control signals for controlling either the first or second electronic device;
- (d) a transmitter for transmitting the control signals to control the respective first and second applications; and
- (e) an illuminating display on the housing for illuminating pushbuttons on the remote control unit, wherein only the subset of pushbuttons for controlling the second electronic device are illuminated when the remote control unit is operated in the second position to control the second electronic device.

19. A remote control unit for controlling the operation of a plurality of video game applications of a video game system, comprising:
- (a) input means for providing user input, wherein a user enters input by operating the remote control in a first hand-held position when controlling the operation of a first video game application and by operating the remote control in a second hand-held position when controlling the operation of a second video game application;
- (b) multiple removable face plates, with at least one face plate corresponding to each video game application, each face plate exposing keys that are activated for the corresponding video game application; and
- (c) transmitting means for transmitting signals to the video game system to operate the video game application.

20. A method for controlling access to operation of video games, comprising the steps of:
- (a) providing a controller unit to users for operating video games on video game consoles, wherein the controller unit includes a keypad with a plurality of keys for controlling the operation of video games;
- (b) designing face plates that are removably attachable to the controller keypad for operating different video games, wherein each face plate has at least one opening through which a key on the keypad protrudes to control a particular video game, and the face plate covers keys on the keypad that are unnecessary for controlling the particular video game; and
- (c) selling the face plates.

* * * * *